United States Patent
Lehmkuhl et al.

(10) Patent No.: US 6,814,947 B1
(45) Date of Patent: Nov. 9, 2004

(54) METHOD FOR PRODUCING CALCIUM COMPOUNDS CONTAINING WATER OF CRYSTALLIZATION

(75) Inventors: Josef Lehmkuhl, Hofheim (DE); Ansgar Fendel, Dortmund (DE); Hubert Bings, Lünen (DE)

(73) Assignee: Rethmann Lippewerk GmbH, Lunen (DE)

( * ) Notice: Subject to any disclaimer, the term of this patent is extended or adjusted under 35 U.S.C. 154(b) by 0 days.

(21) Appl. No.: 09/831,451

(22) PCT Filed: Nov. 10, 1998

(86) PCT No.: PCT/EP98/07174

§ 371 (c)(1),
(2), (4) Date: Nov. 29, 2001

(87) PCT Pub. No.: WO00/27752

PCT Pub. Date: May 18, 2000

(51) Int. Cl.⁷ .............................. C01F 7/00; C01F 11/00
(52) U.S. Cl. .................. 423/115; 423/116; 423/117; 423/158; 423/163; 423/166; 423/127; 423/129; 423/164; 423/165; 423/600
(58) Field of Search ................................ 423/115, 127, 423/129, 164, 165, 600, 116, 117, 166, 163, 158; 162/181.4; 106/461; 57/904; 252/601

(56) References Cited

U.S. PATENT DOCUMENTS 2,636,830 A    4/1953   Wall

FOREIGN PATENT DOCUMENTS

| DE | 153 967   |   | 2/1982 |
| DE | 196 11 454 |   | 9/1997 |
| EP | 0 723 933 |   | 7/1996 |
| JP | 5-147930  | * | 6/1993 |
| JP | 8-2914    | * | 1/1996 |
| WO | 92/15525  |   | 9/1992 |

\* cited by examiner

*Primary Examiner*—Steven Bos
(74) *Attorney, Agent, or Firm*—Wenderoth, Lind & Ponack, LLP

(57) ABSTRACT

The invention relates to the production of calcium compounds containing water of crystallization by means of a chemical reaction between an aqueous alkaline sodium aluminate solution and solid or dissolved or suspended calcium (hydr)-oxide in the presence of carbon dioxide or carbonate; and to the use of these compounds. The resulting precipitate is separated by sedimentation, dehydration, drying and/or clacination and/or grinding or suspending the resulting filter cake and reacted with at least one mineral acid and/or at least one salt of the same. The resulting precipitate, which contains water of crystallization, is separated by sedimentation, dehydration, drying and/or grinding.

The resulting compounds can be used as fillers or as extra white pigments for producing and surface-treating paper, cardboard or card, for producing paints and lacquers, as a flame-retardant filler for fire-protecting construction materials and as a filler for producing plasterboards or building slabs or as a hydraulically active additive for producing expansive cements, expansive plasters and screeds and as a swelling component for explosion-protected explosives.

23 Claims, No Drawings

METHOD FOR PRODUCING CALCIUM COMPOUNDS CONTAINING WATER OF CRYSTALLIZATION

The invention relates to the production and use of calcium compounds containing water of crystallisation, in particular of ionogenic bound compounds on calcium aluminatehydrate and calcium aluminatehydrate salt basis, preferably of the corresponding sulfates, silicates, carbonates, fluorides and/or chlorides. The thus obtained different compounds are useful as fillers or extra white pigments in the production and surface-coating of paper, paperboard or card, in the production of paints and lacquers, such as in the production of paints and lacquers for indoor and outdoor uses or for the rust-protection of metals, as a flame-retardant filler for fire-protecting construction materials, insulating materials, mortars, wallpapers, cardboards, papers and paints as well as fillers for producing plasterboards and construction slabs, respectively, mortars, paints or as an hydraulically active additive for producing swelling cements, swelling plasters and screeds as well as a swelling component for explosion-protected explosives.

Fillers and additives, in particular mineral fillers and additives are used in great extent i.a. in the plastic, paint, tire and ceramic industries as well as in the construction material industries, in particular in pulp and paper industries.

Papier, paperboard and card are produced for example from an aqueous suspension essentially by dehydrating, drying and pressing it. Besides fiber materials like cellulose and wood chips, i.a. also fillers, preferably the natural minerals kaolin (aluminosilicates) and chalk (calcium carbonate) are used. Depending on the requirements in regard to the quality of paper and paperboard, respectively, (printability, whiteness, gloss, strength etc.) the amount of added fillers, however, is limited. Typically it is from 10 to 25% by weight, based on the weight of the paper. In Germany in the paper industries about 3 millions of tons of fillers per year are consumed.

Mineral natural fillers have to be degraded, purified (for example washed) and milled. Higher quality demands of the filler processors have resulted in that more synthetic precipitates, preferably precipitated calcium carbonate, are used. Furthermore, several approaches have been made to use plaster (calcium sulfate) as a filler, in particular the reaction products obtained in vast amounts from fuming gas desulfurisation installations of power plants (REA plaster). However, until yet these were not successful since calcium sulfate is water-soluble up to a concentration of about 2 g $SO_4^{2-}/l$ and no sufficient whiteness has been achieved. In the paper production an accumulation of dissolved calcium sulfate in the process water cycle occurs and therefore undesired deposits and microbiologic problems (for instance by bacteria like desulfovibrio or desulfazomaculum) arose.

In the paper industries a calcium aluminum sulfate precipitate is used as spreading pigment for high quality papers. This product is obtained from the starting materials aluminum sulfate and chalkhydrate according to the following reaction equation:

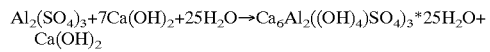

$$Al_2(SO_4)_3 + 7Ca(OH)_2 + 25H_2O \rightarrow Ca_6Al_2((OH)_4)SO_4)_3 \cdot 25H_2O + Ca(OH)_2$$

Since the above chemical reaction only proceeds spontaneously at a high pH of >12, an excess of chalkhydrate is necessary. Furthermore, in this method only suspensions having a solid content of <50% can be obtained, which are known i.a. as satin-white.

A further great application demand for mineral fillers exists in the contruction industries. The development goes to prefabricated constructions and to the increased application of construction slabs. These should be as stabile as possible, heat-protecting and noise-protecting but nevertheless they should be lightweighted and having good fire-protecting properties. For this reason in an increasing, extent construction slabs on plaster basis are produced either as plastercard slabs (outside card, inside plaster) or as plasterfiber slabs (for example mixtures of paper fibers and plaster). Plaster has a crystal water proportion of 2 mole and 21% by weight, respectively. Therefore, a certain fire-protection is ensured. However, this fire-protection could be substantially improved with calcium aluminatesalt precipitates having a higher content of water of crystallisation.

A further application field is the production of insulating boards on fiber basis or other insulating materials. They are prepared from pulp, waste paper, waste textiles, coco and other fiber materials by pressing and they have to be made sufficiently fire-protecting by proper additives. As fire-protecting agents useful are mineral materials having a high content of water of crystallisation.

A further possibility for application of calcium aluminate products in the contruction industries is their use as swelling components. In this case calcium aluminates and calcium sulfoaluminates are used the preparation thereof being carried out by sintering raw materials like bauxite, plaster and chalk at very high temperatures of up to 1400° C. This production is very cost and work intensive. An alternative low-cost preparation of swelling components would be highly desired.

Therefore, the object of the invention was to find crystal water-containing calcium compounds which can be easily produced as precipitates in a large scale process and which can be used advantageously in the above-mentioned application fields.

It has been found that this object according to the present invention can be achieved by a process for producing calcium compounds containing water of crystallisation, the process being characterized in that a) by a chemical reaction between an aqueous alkaline solution of sodium aluminate and a solid or dissolved and suspended, respectively, calcium (hydr)oxide in the presence of carbon dioxide or carbonate a precipitate of a mixture of calcium aluminatehydrates having the following modular formula is formed:

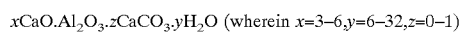

$xCaO \cdot Al_2O_3 \cdot zCaCO_3 \cdot yH_2O$ (wherein $x=3-6, y=6-32, z=0-1$)

and b) the thus obtained precipitate, in a manner known per se, is separated by sedimentation, dehydrated, optionally washed with water and the thus obtained filter cake is either dried and/or calcined and/or milled, c) or the filter cake obtained in step (b) in a wet and/or dried form is suspended in water and added with at least one mineral acid and/or at least one salt thereof for forming a calcium aluminatesalt precipitate containing water of crystallisation, the precipitate is separated by sedimentation, dehydrated, optionally washed with water and the thus obtained filter cake is crushed and optionally dried and/or milled.

As an aqueous alkaline sodium aluminate solution preferably a waste pickling lye as obtained in the surface-treatment of aluminum metal with caustic sodium is used.

A particularly preferably used aqueous alkaline sodium aluminate solution and waste pickling lye, respectively, is such one wherein $Na_2O$ and $Al_2O_3$ are present in a mole ratio of (1.0 to 10.0):1, preferably of (1.2 to 2.5):1.

According to a preferred embodiment of the invention in step (a) a diluted caustic sodium is used as the starting material and an alkaline sodium aluminate solution is then added and calcium hydroxide or calcium oxide in solid form or dissolved or suspended in caustic sodium is further added. The order of the addition of the sodium aluminate solution and of the calcium (hydr)oxide can also be reversed.

As calcium compound(s) preferably chalk milk (chalk hydrate or $Ca(OH)_2$) or burnt chalk (CaO) is used.

The calcium compound(s) is (are) preferably used in an amount of from 2 to 8 mole of CaO equivalents, in particular from 3 to 5 mole of CaO-equivalents, based on 1 mole of $Al_2O_3$ equivalent.

The precipitation of the precipitate in step (a) Is preferably carried out within a reaction time of from 5 to 3000 min, in particular from 60 to 600 min, at a temperature of from 5 to 60° C., preferably from 30 to 50° C. In doing this, a white precipitate of calcium aluminatehydrate containing crystal water is obtained.

According to a preferred embodiment of the invention in step (b) the calcium aluminatehydrate precipitate Is mechanically dehydrated, preferably by using a chamber filter press, a membrane filter press, a vacuum belt filter or a centrifuge.

Thereafter, the crystallisation water-containing calcium aluminatehydrate precipitate dehydrated and optionally washed with water at a temperature between 50 and 200° C. is dried and crushed, preferably milled or at a temperature of from 200 to 1300° C., preferably from 200 to 500° C., it is dried and calcined, respectively, and crushed, preferably milled.

According to a further preferred embodiment of the invention in step (b) the filter cake dehydrated and optionally washed with water is suspended in water and in step (c) it is added with at least one mineral acid and/or at least one salt thereof to form a crystalline calcium aluminatesalt precipitate having a high content of crystallisation water.

To the filter cake suspended in water in step (b) in step (c) as a mineral acid preferably hydrochloric acid, hydrofluoric acid, sulfuric acid, silicic acid and/or carbonic acid and salts thereof, respectively, in particular their alkaline metal, alkaline earth metal and aluminum salts are added.

To the filter cake obtained in step (b) and suspended in water, preferably a sulfate in the form of mineral acids or salts thereof is added in a ratio of 1 part by weight of Al to 4 to 7 parts by weight of $SO_4$, based on the total aluminium content in the suspension.

According to a further preferred embodiment of the invention anions of the above mentioned mineral acid(s) or/and salts thereof are additionally added in a ratio of 1 part by weight of aluminum to 0.5 to 10 parts by weight of anions, based on the total aluminum content of the suspension.

The crystal water-containing precipitate obtainable in step (c) of the process of the present invention can be separated by sedimentation and used as such, however, optionally it can also, prior to its use, be dehydrated, preferably by using a pressure filtration, in particular by means of a chamber filter press or a membrane filter press as well as alternatively by using a vacuum belt filter or a centrifuge, optionally washed with water and thereafter carefully dried at a temperature of below 100° C., preferably between 30 and 60° C. and crushed, preferably milled. After separation, dehydrating and drying the precipitate can also be processed at a temperature of from 100 to 500° C., preferably from 100 to 200° C., and crushed, preferably milled.

The precipitation reaction in step (c) is preferably carried out continuously in a processing zone, in particular in stirred containers while stirring or in several processing zones, in particular in several containers in sequence, while stirring.

The precipitation in step (c) is preferably carried out within a reaction time of from 5 to 3000 min, in particular from 120 to 600 min, at a temperature of preferabty from 5 to 60° C., in particular from 20 to 40° C.

The precipitate produced according to the process of the present invention after the dehydration can also be suspended by using proper dispergators and it can be used in the form of a filler or spreading pigment suspension for producing pulp, paper, paperboard or card as well as for the production of paints and lacquers, construction materials, such as mortars.

A further subject-matter of the invention is the use of the crystal water-containing products produced as described above as a flame-retardant filler for fire-protecting construction materials, insulating materials, mortars, wallpapers, paperboards, papers, for the production of paints and lacquers, as a filler for the production of plasterboards and construction slabs, respectively, or as a hydraulically active additive for producing swelling cements, swelling plasters, screeds and mortars as well as for microfiber armation of cements and mortars.

It is to be noted that the precipitates on the basis of a crystalline crystal water-containing calcium compound obtainable according to the process of the present invention can be used both in the form of a slurry or suspension and in the form of a dry solid or also in calcined and milled form as a filler and additive, respectively.

According to a further aspect the present invention relates to the use of the crystal water-containing calcium compounds prepared according to the present invention as a precipitate in a dehydrated and milled state as an additive in the construction materials industry, preferably as a swelling component for cements and for the explosion-protected blasting as well as for microfiber armation of cements or mortars.

The invention is illustrated in detail in the following examples, however, without being limited thereto.

EXAMPLE 1

Into a stirred vessel one after another are added:

4000 kg of water, 1500 kg of an aluminum pickling lye containing 6% by weight of Al and 18% by weight of $Na_2O$ 450 kg of calcium oxide in the form of chalk milk suspended in water By a chemical reaction a white calcium aluminatehydrate pricipitate containing crystallisation water is formed. After a stirring time of 200 min the alkalinely dissolved aluminum in an amount of more than 90% has been transformed into a hardly soluble calcium aluminate-hydrate precipitate. The precipitate is separated as a filter cake, washed with water and processed as follows:

a) either dried and optionally milled b) or suspended in water and further chemically treated according to step (c) of the process.

The obtained compound was as follows:

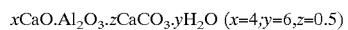

$xCaO.Al_2O_3.zCaCO_3.yH_2O$ ($x=4; y=6, z=0.5$)

EXAMPLE 2

Into a stirred vessel one after another are added:

8000 kg of water 1000 kg of suspended calcium aluminatehydrate precipitate containing 6 weight % of Al and 14 weight % of CaO, prepared according to example 1

350 kg of sulfuric acid containing 45 weight % of $SO_4$ 250 kg eloxalic acid*) containing 1 weight % of Al and 20 weighted of $SO_4$

*) aluminum-containing sulfuric acid derived from an eloxation facility.

By a chemical reaction an extra white crystallisaton water-containing calcium aluminatesalt precipitate is formed. After a stirring time of 300 min the dissolved sulfate in an amount of more than 90% has been transformed into a hardly soluble calcium aluminatesalt precipitate. The precipitate is separated as a filter cake and crushed or suspended or optionally dried and dry-milled.

The obtained compound was as follows:

$$x CaO \cdot Al_2O_3 \cdot y CaSO_4 \cdot z CaCO_3 \cdot n H_2O \ (x=3; y=3; z=0.3; n=30)$$

EXAMPLE 3

This example was carried out similar to example 2, however by using 300 kg of plaster containing 50 weight % of $SO_4$ instead of 350 kg of sulfuric add containing 45 weight % of $SO_4$. The other process measures were identical to those in example 2.

The obtained compound was as follows:

$$x CaO \cdot Al_2O_3 \cdot y CaSO_4 \cdot z CaCO_3 \cdot n H_2O \ (x=3; y=3; z\ 0.3; n=30).$$

What is claimed is:

1. A process for producing calcium compounds containing water of crystallization, which comprises:

a) reacting an aqueous alkaline solution of sodium aluminate with calcium oxide or calcium hydroxide in the presence of carbon dioxide to form a precipitate of a mixture of calcium aluminate hydrates having the following formula:

$$x CaO \cdot Al_2O_3 \cdot y H_2O \ (\text{wherein } x=3-6, y=6-32)$$

b) separating the thus obtained calcium aluminum hydrate precipitate of a) by sedimentation, dehydration, and washing with water to form a filter cake and optionally drying the thus obtained filter cake;

c) suspending the filter cake obtained in b) in a wet and/or dried form in water and admixing the suspended filter cake with at least one mineral acid or with at least one salt thereof to form a calcium aluminate salt precipitate containing water of crystallization, d) separating the calcium aluminate salt precipitate obtained in c) by sedimentation, then optionally dehydrating, and washing with water.

2. The process according to claim 1, wherein as the aqueous alkaline sodium aluminate solution of a), a waste pickling lye obtained by surface-treatment of aluminum metal is used.

3. The process according to claim 1, wherein as the aqueous alkaline sodium aluminate solution of a), a waste pickling lye is used wherein $Na_2O$ and $Al_2O_3$ are present in a mole ratio of (1.0 to 10.0):1 is used.

4. The process according to claim 3 wherein the $Na_2O$ and $Al_2O_3$ are present in a mole ratio of (1.2 to 2.5):1.

5. The process according to claim 1, wherein in a) an aqueous alkaline sodium aluminate solution is used as a starting material and either calcium oxide or calcium hydroxide is added thereto.

6. The process according to claim 1, wherein in a) either calcium hydroxide or calcium oxide is used as a starting material and then the aqueous alkaline sodium aluminate solution is added thereto.

7. The process according to claim 5, wherein from 2 to 8 moles of CaO equivalents, based on 1 mole of $Al_2O_3$ equivalent, are added.

8. The process according to claim 7 where 3 to 5 moles of CaO equivalents based on 1 mole of $Al_2O_3$ equivalent, are added.

9. The process according to claim 1 wherein the precipitation of the precipitate in a) is carried out within a reaction time of from 5 to 3000 minutes, at a temperature of from 5 to 60° C.

10. The process according to claim 9 wherein the reaction time is from 60 to 600 minutes and the temperature is from 30 to 50° C.

11. The process according to claim 1, wherein the calcium aluminate hydrate precipitate in b) is mechanically dehydrated.

12. The process according to claim 11, wherein the mechanical dehydration is performed by using a pressure filtration, a chamber filter press or a membrane filter press or by using a vacuum belt filter or a centrifuge.

13. The process according to claim 11, wherein the dehydrated calcium aluminate hydrate precipitate is dried at a temperature of less than 100° C. and crushed.

14. The process according to claim 11, wherein the dehydrated calcium aluminate hydrate precipitate is dried at a temperature of from 100 to 1300° C., calcined and crushed.

15. The process according to claim 14 wherein the temperature is from 100 to 500° C.

16. The process according to claim 1, wherein the calcium aluminate salt of d) is dried at a temperature of less than 100° C. and crushed.

17. The process according to claim 1, wherein the mineral acid is selected from the group consisting of hydrochloric acid, hydrofluoric acid, sulfuric acid, silicic acid, and carbonic acid.

18. The process according to claim 17 wherein the salts are alkali metal salts, alkaline earth metal salts or aluminum salts.

19. The process according to claim 1, wherein as a mineral acid a sulfuric acid containing aluminum is used.

20. The process according to claim 19 wherein the acid is a waste acid from the electrolytic oxidation of aluminum.

21. The process according to claim 1, wherein in c) a sulfate is added to the filter cake suspended in water in a ratio of 1 part by weight of Al to 4 to 7 parts by weight of $SO_4$, based on the total aluminum content.

22. The process according to claim 17, wherein anions of one or more further mineral acids selected from the group consisting of hydrochloric acid, hydrofluoric acid, sulfuric acid, silicic acid acid, and carbonic acid and are additionally added in amounts of 1 part by weight of Al to 0.5 to 10 parts by weight of anions, based on the total aluminum content of the suspension.

23. The process according to claim 22 wherein said salts are one or more of alkali, alkaline earth metal and aluminum salts.

* * * * *